Patented Dec. 13, 1932

1,891,007

UNITED STATES PATENT OFFICE

FRANCESCO CARLO PALAZZO, OF FLORENCE, ITALY

PROCESS FOR PRODUCING CALCIUM PHOSPHATES RICH IN PHOSPHORIC ACID SOLUBLE IN WATER

No Drawing. Application filed April 12, 1929, Serial No. 354,709, and in Italy April 26, 1928.

My present invention has for its object to provide a process for producing a phosphatic manure rich in phosphoric acid soluble in water, and consists in mixing a precipitate of dicalcium phosphate with high content of $P_2O_5$, with a quantity of phosphoric acid, preferably in concentrated form, corresponding at the most to the quantity for the formation of monocalcium phosphate. If a reaction mixture according to the equation:

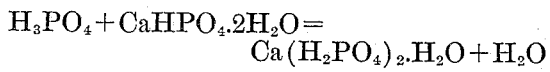
$$H_3PO_4 + CaHPO_4 \cdot 2H_2O = Ca(H_2PO_4)_2 \cdot H_2O + H_2O$$

is used, products are obtained which contain at the lowest a quantity of phosphoric anhydride triple such as contained in ordinary superphosphates. There is however no necessity to keep the proportion between phosphoric acid and dicalcium phosphate so as to exactly correspond to the formation of monocalcium phosphate, but more than 1 mol. of dicalcium phosphate may be used for 1 mol. of phosphoric acid. Products are then obtained which do not contain such quantity of water soluble $P_2O_5$ as the products obtained in accordance with the equation, but only a part of the total $P_2O_5$ contents is soluble in water, whilst the other part is soluble in a neutral solution of ammonium citrate.

The process is always the same whether used for obtaining completely water soluble phosphoric anhydride, or only partially water soluble and partially citrate soluble phosphoric anhydride.

I proceed by first concentrating to about 52-53° Bé. preferably in a multiple effect evaporator plant (under reduced pressure) a solution of phosphoric acid obtained from the phosphate rock by continuous counter current decantation system. The solution of phosphoric acid thus obtained, still warm, is mixed with a quantity of dicalcium phosphate at the least corresponding to the quantity necessary for the above equation, in order to exclude the presence of free unbound phosphoric acid. The reaction mixture is then left at rest for some hours, and the more or less stiff mass is thereupon dried at temperatures of nearly 50° C. preferably in vacuum driers. The mass coming from the drier, if necessary, is crushed or ground.

On working with such quantities of phosphoric acid and dicalcium phosphate as correspond to the above reaction equation a calcium phosphate is obtained which always contains 50 per cent. or a higher percentage of water soluble phosphoric anhydride. If a dicalcium phosphate has been used as starting material, which is rich in $P_2O_5$, containing for instance 37–38 per cent. of $P_2O_5$, by operating according to the said equation, final products are obtained with a content of 51–52 per cent. of water soluble phosphoric anhydride.

If, on the other hand, a greater quantity of dicalcium phosphate is used than that corresponding to the equation, products are obtained which contain simultaneously water soluble and citrate soluble phosphoric anhydride. Practically the products according to the quantity of phosphoric acid used contain 45–50 per cent. of total $P_2O_5$ which is partially soluble in water and partially in ammonium citrate. The total percentage of water and ammonium citrate soluble phosphoric anhydride never descends below 40 per cent.

Having now particularly described and ascertained the nature of my said invention and in what manner the same is to be performed, I declare that what I claim is:

A method of producing a phosphatic manure, rich in water soluble phosphoric acid, which consists in first concentrating to about 52 to 53° Baumé under reduced pressure, a solution of phosphoric acid, adding to said acid while still warm a quantity of precipitated di-calcium phosphate greater than that corresponding to the relation $H_3PO_4 : CaHPO_4$, the time of reaction being only a few hours in order to obtain a stiff mass, then drying the mass in vacuum at about 50° C. and finally grinding the mass.

In testimony whereof I have hereunto set my hand.

FRANCESCO CARLO PALAZZO.